United States Patent Office 3,629,328
Patented Dec. 21, 1971

3,629,328
PURIFICATION OF ORGANIC ACIDS
Adin L. Stautzenberger, Corpus Christi, Tex., and Alexander F. MacLean, Durham, N.H., assignors to Celanese Corporation, New York, N.Y.
No Drawing. Continuation-in-part of application Ser. No. 564,541, July 12, 1966. This application May 20, 1969, Ser. No. 826,255
Int. Cl. C07c 51/42, 61/02
U.S. Cl. 260—525
11 Claims

ABSTRACT OF THE DISCLOSURE

Process for purifying relatively insoluble carboxylic acids such as terephthalic acid by treating the insoluble acid dissolved in aqueous solutions of weak acid salts, the weak acid salts being of lithium, magnesium, tertiary amines or being tetraalkyl quaternary ammonium salts. The insoluble acid is recovered in the free acid form by merely cooling the solution to recrystallize the insoluble acid.

BACKGROUND OF THE INVENTION

This application is a continuation-in-part of copending application Ser. No. 564,541, filed July 12, 1966, now abandoned.

The present invention relates to a method for the purification of difficultly soluble carboxylic acids.

The commercial importance of organic acids such as terephthalic acid in the production of polyesters and in many other uses has increased considerably in recent years. For example an acid such as terephthalic acid is capable of entering into a condensation polymerization with various glycols, such as ethylene glycol and the like, to produce resinous compositions which are capable of being formed into valuable fibers and filaments. In order to obtain these products, however, it is necessary that the organic acids exist in a pure state. The most widely used procedure practiced for purification of insoluble inorganic acids is to convert the acid to an ester. This has the effect not only of neutralizing the acid, but also the ester so produced has a much wider range of distillation temperatures thereby making physical separation feasible.

It is readily apparent that it would be desirable to find a means for easily purifying difficultly soluble carboxylic acids without converting them to their esters. Thus many schemes have been presented in the prior art for purifying carboxylic acids which involve forming solutions of the acids in a solvent and recrystallization from the solvent. Among the solvents are water and alcohols. For some types of impurities mere recrystallization of the acid from solution will adequately remove them but for many troublesome impurities the solution of the carboxylic acid must be treated by appropriate means so that upon recrystallization of the acid less of the undesirable impurities will be present in the recrystallized acid. Some of these treatments of acid solutions cause the impurities to be changed to compounds or adducts which are more soluble than the acid and thus will remain in solution upon recrystallization of the acid. Some treatments however merely oxidize or reduce the impurities to compounds which are not undesirable but which remain with the acid upon recrystallization. Among the various purification treatments that solutions of carboxylic acids may undergo are hydrogenation, oxidation, bi-sulfite treatment and the like. The treatment of solutions of difficultly soluble acids is an effective way to remove impurities however it suffers the disadvantage that unreasonably high temperatures are required to get the acids into solution since no readily available and common solvents are known which will dissolve the insoluble acids at low temperatures. For example at 200° C., the solubility limit of terephthalic acid in water is only about 1.8 percent by weight.

To avoid high temperatures required when treating solutions of the free acid it has been proposed in the prior art that the relatively insoluble carboxylic acids be converted to various salts which are more soluble than the free acid itself. This allows the treatment of the solution to take place at lower temperatures. For example William G. Toland, Jr., in U.S. Pat. 2,664,440 discloses a process for purification in which terephthalic acid is reacted with a tertiary amine to form a salt which is readily soluble in aqueous solutions. The salt, as such, is crystallized from solution and heated to decompose the salt to its corresponding terephthalic acid and tertiary amine.

Another procedure for the purification of carboxylic acids is in U.S. Pat. 3,058,997 to Richard P. Taylor and James C. Selover. In this patent it is disclosed that a phthalic acid may be converted to an alkali metal salt which is readily soluble in water and then the salt dissolved in water and subjected to hydrogenation so as to reduce the impurities. The free acid may then be recovered from solution after first adding a strong mineral acid such as sulfuric or hydrochloric to liberate or spring the acid from the salt.

U.S. Pat. 3,115,521 to Edward A. Swakon discloses that aromatic polycarboxylic acids may be purified by forming a solution of their alkaline salts, such as potassium or sodium salts, followed by treating the solution to remove color forming impurities. Among the various treatments disclosed are passing the solution through activated charcoal, alkaline oxidation with a hypohalite or permanganate, and treating the solution with carbon monoxide. In order to recover the free acid the solutions of the alkaline salt are treated with a strong mineral acid in order to spring the acid from the salt.

It can be realized from the foregoing that while conversion of a relatively insoluble carboxylic acid to a salt so as to obtain greater solubility allows the treatment of solutions at lower temperatures, it complicates the situation by necessitating a step for converting the acid to the salt and also a springing step for reconverting the salt to the free acid. Thus while the methods of the prior art are effective in their own right as means for purifying and increasing solubility of acids such as terephthalic acid, they tend to be impractical on a commercial scale. It therefore becomes evident that it is important to find other means for getting difficultly soluble acids into solution so that they may be treated to remove impurities and then recovered from solution in the free acid form.

It is thus an object of the present invention to provide an improved process for forming solutions of difficultly soluble carboxylic acids whereby the acids may be treated for the removal of impurities and from which solutions the acids may then be easily recovered in their free acid form.

SUMMARY

These and other objects are accomplished by the present invention which in one of its aspects is a process for the purification of crystalline, relatively insoluble carboxylic acids having undesirable impurities comprising the steps of (1) forming a solution of said relatively insoluble carboxylic acids in an aqueous solution of a weak acid salt, said salt being (a) a weak acid salt of lithium, (b) a weak acid salt of magnesium, (c) a weak acid salt of a tertiary amine or (d) a weak acid quarternary ammonium salt having a quaternary ammonium ion of the formula $(R)_4N^+$ where each R represents the same or different alkyls of from 1 to 6 carbon atoms, (2) treating said solution so as to diminish the amount of said impurities in said carboxylic acid upon recrystallization as hereinafter defined, (3) recovering said relatively insoluble carboxylic acid from solution essentially by cooling said solution so as to recrystallize said relatively insoluble carboxylic acids from solution in a free acid form which is substantially free of the cation of said salt and (4) separating from the mother liquor the thus crystallized, relatively insoluble carboxylic acid having less of said impurities than originally contained in said carboxylic acid and being substantially free of the cation of said weak acid salt.

DESCRIPTION OF THE PREFERRED EMBODIMENTS

The present invention resides in the discovery that difficultly soluble carboxylic acid may be readily dissolved in aqueous solutions of specific weak acid salts and then the carboxylic acids recovered in their free acid form merely by cooling the solution so as to cause recrystallization of the carboxylic acids. It is pointed out that the cation of the weak acid salt utilized must be taken from the group mentioned above and that closely related cations are not operative. For example terephthalic acid may be readily dissolved in either aqueous 2 molar lithium acetate or 2 molar magnesium acetate and then cooled so as to recrystallize pure terephthalic acid in its free acid form uncontaminated with the lithium or magnesium. On the contrary if terephthalic acid is dissolved in aqueous 2 molar sodium or potassium acetate and then merely cooled so as to recrystallize the terephthalic acid, the terephthalic acid so recrystallized will be only about 40 to 50% pure terephthalic acid in the free acid form with the remainder of the crystals being sodium terephthalate or potassium terephthalate. Furthermore the terephthalic acid is much more soluble in lithium acetate and magnesium acetate than either potassium or sodium acetate. Likewise recrystallization of terephthalic acid from ammonium acetate by merely cooling the solution gives a product having high percentages of ammonium terephthalate while recrystallization from the tetraethylammonium acetate of the present process gives pure terephthalic acid uncontaminated with the tetraethylammonium cation. Thus it may be appreciated that while difficultly soluble acids can be dissolved in aqueous solutions of weak acid salts other than those of the present invention, they cannot be recovered from these other weak acid salt solutions in the manner discovered by us—that is by merely cooling. It is to be understood however that merely dissolving a crude acid such as crude terephthalic acid in an aqueous lithium acetate solution followed by recrystallization does not provide any significant purification of the terephthalic acid unless the solution is treated by appropriate means before recrystallization. Of the various cations that may be utilized in the present invention lithium is preferred over the others.

The weak acids which form the anion of the weak acid salts useful in the present invention may be organic or inorganic and should generally have pK values within the range of from about 3–5. The organic acids, especially the aliphatic carboxylic acids of 1–6 carbon atoms are preferred. Examples of suitable weak acids include organic acids such as formic acid, acetic acid, propionic acid, butyric acid, isobutyric acid, succinic acid, lactic acid and p-chlorobenzoic acid; and inorganic acids such as tetraboric acid, hydrofluoric acid, selenic acid, and telluric acid.

The tertiary amines used to form the salts used in the practice of this invention are generally those having pK values of from about 2.5 to about 5.0. Suitable examples of such amines include trialkylamines, such as trimethylamine, triethylamine, tripropylamine, triisopropylamine, alkanolamines such as triethanolamine, trimethylolamine and triisopropanolamines, and cyclic amines such as N-methyl morpholine, cyclohexyldimethylamine, N-methylpiperidine and N,N-dimethyl aniline.

These weak acid salts of tertiary amines are generally of those tertiary ammonium salts of the formula:

$$[R_2-\underset{\underset{R_3}{|}}{\overset{\overset{R}{|}}{N}}-H]^+ \ X^- \qquad (I)$$

wherein $R_1$, $R_2$ and $R_3$ are alkyl, hydroxyalkyl, aryl or alkaryl radicals and X is a weak acid radical. Preferably each of $R_1$, $R_2$ and $R_3$ contains from 1 to 10 carbon atoms.

Suitable examples of weak acid salts of tertiary amines used in the practice of this invention are triethylammonium acetate, triethylammonium formate, triethanolammonium acetate, trimethanolammonium butyrate, trimethylammonium acetate, N,N-dimethyl aniline acetate and tribenzylammonium propionate. Illustrative of the quaternary ammonium salts which may successfully be employed in the present invention are tetrabutylammonium acetate, tetrapropylammonium acetate, tetramethylammonium propionate. Examples illustrative of the lithium and magnesium salts operative in this invention include lithium acetate, magnesium acetate, lithium propionate, lithium succinate and magnesium butyrate. Organic coupling solvents such as water miscible alcohols and ketones may be advantageously added in an amount of up to about 70% of total volume, e.g. 2 to 50% of total volume, to further increase the solubility of the organic acid in the aqueous salt solution. Preferred alcohols include methyl alcohol, ethyl alcohol, isopropyl alcohol, ethylene glycol, tertiary butyl alcohol, n-butyl alcohol, etc. The ketones which are preferred include particularly acetone and methyl ethyl ketone.

Organic acids solubilized in the weak acid salts of the present invention are contained within the resulting solution in their original form and this solution may be treated by appropriate means so as to remove impurities such as related aldehydes which are originally present and dissolved with the organic acids in the solution. The particular impurities present in the relatively insoluble carboxylic acids depend mainly on the method used for manufacturing the carboxylic acid. A great many carboxylic acids are produced by oxidation and the main impurities will be those due to incomplete oxidation of the precursor such as aldehydes and ketones. Other impurities may also arise from the catalyst utilized. Terephthalic acid, for which the present invention is especially suited, is generally made by air or nitric acid oxidation of p-xylene or by rearrangement of potassium salts of benzoic or phthalic acids, generally known as Henkel rearrangements. Terephthalic acid produced by the oxidation of p-xylene will usually contain aromatic aldehydes and ketones as undesirable impurities however nitrogen-containing color bodies may also be present especially when the terephthalic acid has been made by nitric acid oxidation and/or with amine catalysts. Particular impurities which are known to be in terephthalic acid include 4-carboxybenzaldehyde and p-acetylbenzoic acid.

The present invention does not lie in the discovery of any new means for treating the solutions so as to remove impurities. As was pointed out above the prior art is filled with methods for treating solutions of difficultly soluble acids or solutions of various salts of these difficultly soluble acids and any of these treating methods may be utilized, the method utilized depending somewhat on the type of impurities present. For example, strong oxidizers such as hypohalite, permanganate, dichromate, or peracetic acid may be added to the solution to oxidize any aldehyde to its corresponding acid. Likewise reducing agents such as hydrogen may be utilized to cause chemical reduction of the impurities. The hydrogenation purification of carboxylic acids such as phthalic acids is well known from such patents as U.S. 3,058,997. In these hydrogenation purifications of solutions of carboxylic acids the temperatures may vary generally from about 80 to 170° C. with the pressures being sufficient to maintain a liquid phase. The time required is usually from about 2 to 30 minutes. A catalyst is suitably used and various metal hydrogenation catalysts are well known. Among the hydrogenation catalysts are metals such as platinum, palladium, and rhodium which may be disposed on a suitable support. Other catalysts include platinum oxide and Raney nickel in addition to those specifically mentioned, other Group VIII catalysts are also effective.

Alternatively to chemical oxidation or reduction, impurities such as aldehydes, ketones, etc. present in the difficultly soluble carboxylic acids may be reacted with reagents such as hydroxyl amine to form an oxime which may be removed by extraction or recrystallization. Other useful reagents include sodium bisulfite and sodium sulfite. Also many colored or colorforming impurities may be removed by charcoal treatment. In addition to giving high product purity, crystallization of the organic acids from solution has the advantage of producing crystals of large size. Any impurities occluded or otherwise physically entrapped within such large crystals can be readily removed by further recrystallization and washing.

The weak acid salts of lithium, tertiary amines, or quaternary ammonium compounds, may be prepared by any of the accepted procedures, for example, reacting lithium oxide with acetic acid to produce lithium acetate. The salts so produced are dissolved in an aqueous solution to a molar concentration of from about 0.5 to 4 M, preferably from 1 molar to 2 molar concentration. The solubilization of the organic acid may take place in solution having a temperature of from about 0 to 200° C. with a preferred temperature being 70 to 200° C. Appropriate superatmospheric pressure may be used to maintain the solution in liquid phase. The recovery of the difficultly soluble acids from solution is accomplished by cooling the solution so as to recrystallize the acid. The addition of springing agents such as strong mineral acids is neither necessary or desirable. However the cooling to effect recrystallization may be accompanied by a reduction in pressure such as in a vacuum recrystallizer. The temperature of cooling should be below about 40° C. and is preferably below about 10° C.

This invention is most applicable to the solubilization and treatment of carbocyclic carboxylic acids of 6 to 20 carbon atoms which are free of ethylenic and acetylenic unsaturation and which are composed of carbon, hydrogen, oxygen and halogen atoms. It is especially applicable to terephthalic acid. Examples of carbocyclic carboxylic acids which are aromatic in nature are phthalic acid, terephthalic acid, isophthalic acid, benzoic acid, p-carboxyphenyl acetic acid, p-p-dicarboxyldiphenyl acids, p-t-butylbenzoic acid. Examples of carbocyclic acids which are cycloaliphatic in nature are hexahydrobenzoic acid, cis and trans-hexahydroterephthalic acid, hexahydrosalicyclic acid, 2,5-dichlorocyclohexane-dicarboxylic acid-1,4; 2-chlorocyclohexane-dicarboxylic acid-1,4; 4-chlorocyclohexane-dicarboxylic acid-1,3: 4-chloro-1-carboxycyclohexane.

In the absence of indications to the contrary, all proportions and concentrations of materials are expressed herein on a weight basis.

The invention may additionally be described by the following examples:

EXAMPLE I

Solubility in water

Pure terephthalic acid was mixed with water and tested for solubility. Results indicated the acid was about 0.001% soluble at 25° C. and 0.03% soluble at 100° C. Practical recrystallization of terephthalic acid required a minimum of 5% solubility which was not attained in water until a temperature of 220° C. was reached. In sharp contrast, a 2 M lithium acetate solution terephthalic acid reached 5% solubility at a temperature of 108° C.

Solubility in salt solution 50 g. of terephthalic acid was mixed with a 250 ml. of 2 molar aqueous solution of lithium acetate at a convenient laboratory temperature of 100° C. Tests showed the terephthalic acid to be 4.6% soluble in the salt solution. Recrystallization was possible from a solution saturated at 100° C. by reducing the temperature to 25° C. Crystals were filtered, washed with water, and dried for an hour at 110° C.

Analysis showed the needle-like crystals obtained to be 100% terephthalic acid and no evidence of lithium was found.

The solubility of terephthalic acid was found not to be in proportion to the concentration of the salt used as indicated by the following table.

TABLE I.—EFFECT OF SALT CONCENTRATION ON TEREPHTHALIC ACID SOLUBILITY

| LiO Ac, M: | ° C. (±2°) | Solubility, g. TPA/100 g. solvent |
|---|---|---|
| 0.5 | 25 | 1.2 |
| 0.5 | 100 | 4.0 |
| 1.0 | 25 | 1.6 |
| 1.0 | 100 | 6.0 |
| 2.0 | 25 | 2.4 |
| 2.0 | 100 | 6.8 |
| 4.0 | 25 | 3.2 |
| 4.0 | 100 | 7.2 |

EXAMPLE II 250 ml. of 2 M solution of triethylammonium acetate (32.2%) in water was intimately mixed with 5.0 g. of terephthalic acid. Conventional solubility tests indicated that the acid was 4% soluble in the aqueous solution at 100° C.

EXAMPLE III 50 g. of trans-hexahydroterephthalic acid was mixed with 250 ml. of water and tested for solubility by conventional means at 25° C. and 100° C. The test was repeated, at 20° C. and 100° C., using the same proportions, with a 1 M lithium acetate aqueous solution being substituted for the water of the first experiment. The results were as follows:

SOLUBILITY OF TRANS-HEXAHYDROTEREPHTHALIC ACID IN WATER AND 2 M LITHIUM ACETATE SOLUTION

| Temperature, ° C | 20 | 25 | 100 |
|---|---|---|---|
| Trans-hexahydroterephthalic acid in water, percent | | 0.1 | 1.3 |
| Trans-hexahydroterephthalic acid in 2 M lithium acetate solution, percent | 1.7 | | 6.0 |

EXAMPLE IV

Experiments were conducted using 50 g. samples of terephthaldehydic acid and p-toluic acid. The samples were mixed with 250 ml. of water and a 2 M lithium acetate solution, respectively. The results of the conventional solubility tests are shown below:

SOLUBILITY OF TEREPHTHALDEHYDIC AND p-TOLUIC ACIDS IN WATER AND LITHIUM ACETATE SOLUTION

| | 20° C. | 40° C. | 80° C. |
|---|---|---|---|
| Terephthaldehydic acid in water, percent | 0.105 | 0.075 | 0.13 |
| Terephthaldehydic acid in lithium acetate solution, percent | 8.00 | 10.60 | |
| p-Toluic acid in water, percent | 0.035 | 0.08 | 0.45 |
| p-Toluic acid in lithium acetate solution, percent | 3.00 | 3.58 | 7.8 |

EXAMPLE V

A number of experiments were conducted to test the solubility of terephthalic acid in various 2 M salt solutions. In each of the experiments the solutions were merely cooled to room temperature to cause recrystallization of the terephthalic acid. The results in the table below show that lithium and tertiary ammonium salts of weak acids are excellent solubilizers of terephthalic acid in aqueous solution and also indicate that such salt solutions have no effect on the total amount of terephthalic acid present as the free acid recovered in crystallization. The use of other salt solutions increased the solubility of the acid somewhat but analysis data exhibit a marked drop in the percentage analyzed as free terephthalic acid upon recovery. The percentage of the product which was not free terephthalic acid was a salt of terephthalic acid, the cation of this terephthalic acid salt being the same as the cation of the weak acid salt used. In the table "TPA" represents terephthalic acid.

SOLUBILITY OF TEREPHTHALIC ACID IN AQUEOUS 2 M SALT SOLUTIONS

| Salt | Solubility, g./100 g. solvent at 100° C. | Product crystal analysis as free TPA, percent |
| --- | --- | --- |
| Ammonium acetate | 3.0 | 58 |
| Sodium acetate | 2.0 | 45 |
| Potassium acetate | 1.6 | 42 |
| Lithium acetate | 6.8 | 100 |
| Magnesium acetate | 4.0 | 100 |
| Rubidium acetate | 2.0 | 44 |
| Cesium acetate | 0.8 | 40 |
| Trimethylammonium acetate | 3.0 | 100 |
| Triethanolammonium acetate | 7.0 | 100 |
| Lithium perchlorate | 0 | |
| Lithium chloride | 0.1 | |
| Lithium formate | 1.8 | 100 |
| Lithium propionate | 8.8 | 100 |
| Lithium succinate | 7.4 | 100 |
| Sodium acid succinate | 0.3 | 70 |
| Triethanolammonium acid oxalate | 0.2 | 100 |
| Lithium terephthalate (0.8 M) | 0.8 | 100 |
| Triethylammonium acetate | 4.0 | 100 |
| Sodium methanesulfonate | 0 | |
| Sodium toluenesulfonate | 0 | |
| Triethylammonium chloride | 0 | |
| Lithium aminoacetate | 12 | (¹) |

¹ No crystals.

EXAMPLE VI

Tests were conducted using a 2 molar lithium acetate solution to which was added varying percentages of ethanol or acetic acid as coupling agents. The resulting solubility data tabulated below show that the solubility of the organic acids in aqueous salt solution can be greatly affected by the addition of such coupling agents.

EFFECT OF COUPLING AGENTS ON SOLUBILITY OF SALT SOLUTION

| Solvent, 2 M lithium acetate, percent | | Temp., °C. | G./100 g. solvent | |
| --- | --- | --- | --- | --- |
| H₂O | Ethanol | | Terephthalic acid | p-Toluic |
| 100 | 0 | 100 | 6.8 | |
| 35 | 15 | 96 | 10.4 | 28.6 |
| 75 | 25 | 90 | 21.4 | 37.0 |
| 85 | 15 | 25 | 3.4 | 4.0 |
| 75 | 25 | 25 | 4.7 | 6.4 |
| 50 | 50 | 25 | 8.0 | 20.0 |
| 0 | 100 | 25 | 0.1 | |
| | Acetic acid | | | |
| 85 | 15 | 25 | 0.4 | 0.8 |
| 75 | 25 | 25 | 0.9 | 0.8 |
| 75 | 25 | 102 | 2.8 | 20.8 |
| 50 | 50 | 102 | 1.1 | 17.0 |
| 50 | 50 | 25 | 0.3 | 3.1 |
| 0 | 100 | 115 | 0.1 | |

EXAMPLE VII

Crude terephthalic acid containing 2.1% p-carboxybenzaldehyde impurities was dissolved in a 1 M aqueous lithium acetate solution at 100° C. This solution was then hydrogenated using a Raney nickel catalyst at 100° C. and 200 p.s.i.g. for two hours. At the end of the two hours the solution was cooled to about 10° C. causing the terephthalic acid to recrystallize, the terephthalic acid crystals separated by filtration, washed with water, and analyzed. The analysis showed the terephthalic acid contained only about 238 p.p.m. of p-carboxybenzaldehyde and no lithium could be detected in the product.

EXAMPLE VIII

Example VII was repeated except that a palladium on carbon catalyst was utilized and the time of the hydrogenation increased three hours. The terephthalic acid recovered contained only 133 p.p.m. of p-carboxybenzaldehyde and no lithium could be detected in the product.

EXAMPLE IX

Crude terephthalic acid containing 2.5% of p-carboxybenzaldehyde impurities was dissolved to saturation in aqueous 2 M lithium acetate at 100° C. and then 2.5 grams of potassium permanganate per 100 grams of dissolved crude terephthalic acid was added to the solution. The manganese dioxide formed by permanganate reduction was filtered at 100° C. and then the filtrate cooled to room temperature causing recrystallization of the terephthalic acid. The crystals so formed contained less than 100 p.p.m. of p-carboxybenzaldehyde and no lithium could be detected in the product.

EXAMPLE X

Terephthalic acid product by nitric acid oxidation of p-xylene and containing colored impurities such that an aqueous aniline solution of the terephthalic acid appeared pale yellow, was dissolved to saturation at 100° C. in a 2 M solution of lithium propionate. To 500 ml. of this solution was added 2 grams of decolorizing charcoal powder (Norit-A) and the mixture was stirred for 10 minutes at 100° C. The carbon was separated by filtration and the filtrate was allowed to cool to 20° C. so as to recrystallize the terephthalic acid. The resulting terephthalic acid crystals were separated by filtration and washed with water. The color of an aqueous aniline solution of the recrystallized acid was essentially water-white in comparsion with the pale yellow color given by the untreated terephthalic acid. No lithium could be detected in the recrystallized product.

EXAMPLE XI

Crude terephthalic acid containing about 2.5% p-carboxybenzaldehyde impurities was dissolved to saturation at 100° C. in a 2 M lithium acetate solution. The solution was then allowed to cool to 20° C. and the resulting terephthalic acid crystals recovered by filtration, washed with water, and analyzed. The analysis showed that the product contained about 3.2% p-carboxybenzaldehyde impurities and no lithium could be detected. This example illustrates that mere crystallization of terephthalic acid from the weak acid salt solutions of the present invention do not provide purification.

EXAMPLE XII

Thirty milliliters of a 2 M aqueous lithium acetate solution was saturated at 70° C. with a terephthalic acid which had been produced by the liquid phase air oxidation of p-xylene and cotnained 5% p-toluic acid and 2.5% p-carboxybenzaldehyde as impurities. The solution of the impure terephthalic acid in the aqueous lithium acetate was then shaken with 30 milliliters of cyclohexanone at 80° C. so as to extract the impurities into the cyclohexanone. The resulting two liquid phases were then allowed to separate. The aqueous phase was removed and cooled to room temperature so as to recrystallize the terephthalic acid. The crystals formed were removed and analyzed. Analysis showed the recovered terephthalic acid to contain about 1.5% p-carboxybenzaldehyde and less than 0.5% of p-toluic acid. No lithium could be detected in the product.

The foregoing example illustrates that a relatively and less than 0.5% of p-toluic acid. No lithium could be detected in the product.

The foregoing example illustrates that a relatively insoluble carboxylic acid may be purified by forming a solution of the impure carboxylic acid in a weak acid salt solution and then extracting the impurities from the solution by use of a selective solvent. In addition to the particular solvent used in the foregoing example other solvents which may be used include n-butanol, p-xylene, diethyl ether, chloroform, and chlorobenzene.

EXAMPLE XIII

The aldehydic impurities in impure terephthalic acid produced by the air oxidation of p-xylene was removed by electrolytic reduction as follows. In an electroylic cell containing a diaphragm of unglazed porcelain was charged 2 M aqueous lithium acetate as anolyte. The catholyte was 2 M lithium acetate saturated at 70° C. with terephthalic acid which contained 2.2% p-carboxybenzaldehyde as an impurity. The working temperature of the cell was 80° C. The electrodes were made of platinum and the current density on the cathode was 28–37 amperes per square foot at volts. Current equivalent to twice the aldehyde present was passed. The catholyte was removed and allowed to cool to 25° C. The resulting recrystallized terephthalic acid contained approximately 1.1% p-carboxybenzaldehyde. The current efficiency was approximately 25%.

The embodiments of the invention in which an exclusive property or privilege is claimed are defined as follows:

1. A process for the purification of crystalline, relatively insoluble carbocyclic carboxylic acids having undesirable impurities comprising the steps of (1) forming a solution of the relatively insoluble carboxylic acids in an aqueous solution of a weak acid salt, said salt being (a) a weak acid salt of lithium,
(b) a weak acid salt of magnesium,
(c) a weak acid salt of a tertiary amine or
(d) a weak acid quarternary ammonium salt having a quaternary ammonium ion of the formula $(R)_4N^+$ where each R represents the same or different alkyls of from 1 to 6 carbon atoms, (2) treating said solution so as to diminish the amount of said impurities in said carboxylic acid upon recrystallization as hereinafter defined, (3) recoverying said relatively insoluble carboxylic acid from solution essentially by cooling said solution so as to recrystallize said relatively insoluble carboxylic acid from solution in free acid form which is substantially free of the cation of said salt and (4) separating from the mother liquor the thus crystallized, relatively insoluble carboxylic acid having less of said impurities than originally contained in said carboxylic acid and being substantially free of the cation of said weak acid salt.

2. The process of claim 1 wherein said relatively insoluble carboxylic acid is a carbocyclic carboxylic acid of 6 to 20 carbon atoms free of ethylenic and acetylenic unsaturation and which is composed of atoms selected from the group consisting of carbon, hydrogen, oxygen and halogen atoms and wherein said weak acid salt of a tertiary amine has a cation of the formula

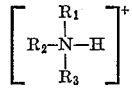

wherein $R_1$, $R_2$, and $R_3$ are alkyl, hydroxyalkyl, aryl or alkaryl radicals of 1 to 10 carbon atoms.

3. The process of claim 1 wherein said relatively insoluble carboxylic acid is terephthalic.

4. The process of claim 1 wherein said weak acid salt is a lithium salt of an aliphatic carboxylic acid of 1 to 6 carbon atoms.

5. The process of claim 1 wherein said treating comprises a treatment with an oxidizing agent or a reducing agent at a temperature of from about 80 to 170° C.

6. The process of claim 1 wherein said aqueous solution of a weak acid salt is a 0.5 to 4.0 molar solution of the salt of an aliphatic carboxylic acid of 1 to 6 carbon atoms.

7. The process of claim 2 wherein said carbocyclic carboxylic acid is terephthalic acid containing aromatic aldehydes or ketones as impurities.

8. A process for the purification of terephthalic acid produced by the oxidation of p-xylene and having undesirable impurities therein comprising the steps of (1) forming a solution of terephthalic acid in 0.5 to 4.0 molar aqueous solution of a lithium salt of an aliphatic carboxylic acid of 1 to 6 carbon atoms, (2) treating the resulting terephthalic acid solution so as to diminish the amount of said impurities in the terephthalic acid upon recrystallization as hereinafter defined, (3) recovering the terephthalic acid from solution essentially by cooling said solution so as to recrystallize the terephthalic acid from solution in free acid form which is substantially free of lithium and (4) separating from the mother liquor the thus crystallized terephthalic acid having less of said impurities than originally contained therein and being substantially free of lithium.

9. The process of claim 8 wherein said treating is with an oxidizing agent.

10. The process of claim 8 wherein said treating is by hydrogenation in the presence of a hydrogenation catalyst and temperatures within the range of from about 80 to 170° C.

11. The process of claim 8 wherein said treating comprises a treatment of the solution with activated charcoal.

References Cited

UNITED STATES PATENTS

| | | |
|---|---|---|
| 3,047,621 | 7/1962 | Tate. |
| 3,058,997 | 10/1962 | Taylor et al. |
| 3,115,521 | 12/1963 | Swakon. |
| 3,465,035 | 9/1969 | Nakaguchi et al. |

FOREIGN PATENTS

| | | |
|---|---|---|
| 726,213 | 1/1966 | Canada. |
| 23,401 | 10/1964 | Japan. |
| 23,610 | 10/1968 | Japan. |

LEWIS GOTTS, Primary Examiner

R. S. WEISSBERG, Assistant Examiner

U.S. Cl. X.R.

260—514 R

DOCKET NO. 4290A

UNITED STATES PATENT OFFICE
CERTIFICATE OF CORRECTION

PO-1050
(5/69)

Patent No. 3,629,328          Dated December 21, 1971

Inventor(s) Adin L. Stautzenberger et al

It is certified that error appears in the above-identified patent and that said Letters Patent are hereby corrected as shown below:

Please correct the following errors:

On page 3, column 6, line 31, please replace "5.0" with --50--.

On page 4, column 8, lines 69 - 71, please delete "The foregoing example illustrates that a relatively and less than 0.5% of p-toluic acid. No lithium could be detected in the product".

Signed and sealed this 25th day of July 1972.

(SEAL)
Attest:

EDWARD M. FLETCHER, JR.
Attesting Officer

ROBERT GOTTSCHALK
Commissioner of Patents